United States Patent [19]

Stott et al.

[11] Patent Number: 5,443,741
[45] Date of Patent: Aug. 22, 1995

[54] TREATMENT OF DILUTE ACIDIC SOLUTIONS

[75] Inventors: John A. Stott; John G. Allen, both of Warrington, England

[73] Assignee: Imperial Chemical Industries PLC, London, United Kingdom

[21] Appl. No.: 195,059

[22] Filed: Feb. 14, 1994

Related U.S. Application Data

[63] Continuation of Ser. No. 64,786, May 21, 1993, abandoned, which is a continuation of Ser. No. 791,160, Nov. 13, 1991, abandoned.

[30] Foreign Application Priority Data

Nov. 19, 1990 [GB] United Kingdom ............... 9025126

[51] Int. Cl.$^6$ ........................ C02F 1/58; C02F 1/54
[52] U.S. Cl. ............................ 210/726; 210/727; 210/915
[58] Field of Search ............. 210/915, 726, 727, 728, 210/732, 753; 423/158, 163, 166

[56] References Cited

U.S. PATENT DOCUMENTS 2,371,759  3/1945  King et al. ..................... 210/915

FOREIGN PATENT DOCUMENTS

| 2362083 | 4/1978 | France | 210/915 |
| 43574 | 4/1972 | Japan | 210/915 |
| 52198 | 5/1974 | Japan | 210/915 |
| 90273 | 8/1974 | Japan | 210/915 |
| 15357 | 2/1975 | Japan | 210/915 |

OTHER PUBLICATIONS

Rabosky, J. G.; Miller, J. P. Jr.; "Fluoride Removal by Lime Precipitation and Alum and Polyelectrolyte Coagulation" pp. 669–676.

*Primary Examiner*—Neil McCarthy
*Attorney, Agent, or Firm*—Cushman Darby & Cushman

[57] ABSTRACT

A process for the treatment of acidic fluoride-containing solutions to neutralize them and to remove fluoride ion in the form of a readily filterable precipitate which comprises mixing the acidic solution with a suspension of an alkaline earth metal oxide or hydroxide, wherein a flocculating agent is incorporated in the acidic solution before mixing thereof with the alkaline earth metal oxide or hydroxide.

8 Claims, No Drawings

TREATMENT OF DILUTE ACIDIC SOLUTIONS

This is a continuation of application Ser. No. 08/064,786, filed on May 21, 1993, abandoned, which is a continuation of Ser. No. 07/791,160 filed on Nov. 13, 1991, which is abandoned upon the filing hereof.

This invention relates to a process for the treatment of acidic solutions containing fluoride ion to remove the fluoride ion and to an embodiment of the process for treating acidic aqueous fluoride-containing effluent from chemical plant to produce a neutralised aqueous effluent suitable for discharge to drain and to recover the fluoride ion as a water-insoluble compound suitable for disposal as solid waste or for use as a source of e.g. hydrogen fluoride.

Fluorine and/or hydrogen fluoride are used extensively in industry as fluorinating agents and such use frequently involves the creation of an aqueous solution of hydrogen fluoride either as a reagent or more often as an effluent. In gaseous-phase fluorination reactions, for example, the removal of hydrogen fluoride from the reaction product stream frequently involves aqueous washing thereby creating an aqueous solution which frequently also contains other acids such as hydrochloric acid or sulphuric acid. Acidic effluents containing fluoride ion need to be neutralised and freed from fluoride ion before they can be discharged to drain.

Neutralisation of acidic solutions with alkali metal or alkaline earth metal oxides or hydroxides is well known but such treatments do not result in satisfactory removal of fluoride ion from the solutions. Neutralisation with alkali metal hydroxides results in the production of soluble fluorides. Use of alkaline earth metal oxides or hydroxides results in the formation of insoluble fluorides but the resulting precipitates, even after flocculation with a flocculating agent, tend to be gelatinous and not readily removed by filtration.

We have now found, surprisingly, that the treatment of acidic fluoride ion containing solutions with alkaline earth metal oxides or hydroxides can lead to a readily filterable precipitate of alkali metal fluoride if a flocculating agent is added to the acidic solution before neutralisation of the solution with the alkaline earth metal oxide or hydroxide.

According to the invention there is provided a process for the treatment of acidic fluoride-containing solutions to neutralise them and to remove fluoride ion in the form of a readily filterable precipitate which comprises mixing the acidic solution with a suspension of an alkaline earth metal oxide or hydroxide, wherein a flocculating agent is incorporated in the acidic solution before mixing thereof with the alkaline earth metal oxide or hydroxide.

In a preferred embodiment of the invention, mixing of the acidic solution with the alkaline earth metal oxide or hydroxide is under conditions such that the fluoride ion is in stoichiometric excess with respect to alkaline earth metal ion since we have found that such conditions require less alkaline earth metal hydroxide to effect neutralisation and complete removal of fluoride ion than is required if the alkaline earth metal is in stoichiometric excess with respect to fluoride ion. For this reason, we prefer to add the alkaline earth metal oxide or hydroxide to the fluoride-containing acidic solution rather than vice versa.

The amount of the flocculating agent added to the acidic solution will depend to some extent upon the concentration of fluoride ion (and hence the amount of insoluble fluoride salt precipitated) and may be up to a few percent by weight of the solution. However we have found, surprisingly, that at least in the case of very dilute solutions of fluoride ion (say up to 2% by weight hydrogen fluoride) by adding the flocculating agent to the acidic solution prior to neutralisation and by maintaining the fluoride ion in stoichiometric excess during mixing (e.g. by adding the alkaline earth metal oxide or hydroxide to the acidic solution), an amount of flocculating agent below 0.1% by weight is usually sufficient to provide a readily filterable precipitate. In fact in most instances as little as 50 to 100 ppm of flocculating agent is sufficient for treating solutions containing less than 1% by weight of hydrogen fluoride.

The process of the invention is suitable for treating acidic solutions containing up to several % by weight of fluoride ion but is particularly suitable for treating dilute solutions such as are commonly encountered in effluent streams from fluorination reactions. In general, the concentration of fluoride in the acidic solution being treated should preferably be in the range 0.25% to about 1% by weight, especially in cases where the solution contains an appreciable amount of another acid such as hydrochloric acid or sulphuric acid. The solution being treated and to which the flocculating agent is added will usually have a pH less than 6 and its pH may be as low as 1.

The acidic solution may, and in the case of effluents usually does, contain an acid other than hydrofluoric acid, for example hydrochloric acid and/or sulphuric acid. In such cases, we have found that as the concentration of acid in the solution increases, operation of the process becomes increasingly difficult in practice owing to the large volumes of neutralising agent required. We therefore prefer that the amount of other acid in the solution be below about 10% by weight and in particular be below about 5% by weight. We especially prefer that the total amount of acid in the solution be below about 2% by weight.

The flocculating agent may be a cationic, anionic or non-ionic agent or a mixture thereof. Since the agent is added to a strongly acidic environment we prefer to use a cationic agent but this is not essential and we have obtained satisfactory results using anionic and non-ionic agents. It will be appreciated that some flocculating agents afford better results than others depending for instance upon the particular acidic solution being treated but it is a simple matter of routine experimentation to determine the optimum flocculating agent for a particular solution to be treated.

Flocculating agents of all known types may be employed, including for example synthetic homopolymers and copolymers produced by radical polymerisation of water-soluble, ethylenically unsaturated monomers such as acrylates and methacrylates and condensation and grafted products derived from compounds containing reactive nitrogen, halogen or oxygen atoms such as acrylamides. The molecular weight of the compound may vary within a wide range, for example from $1 \times 10^3$ to $50 \times 10^6$, and the polymer chains may be linear or branched and cross-linked or not cross-linked. In general, polymers derived from monomers containing an ionisable group such as a carboxyl or amino group will be ionic (anionic or cationic) whilst those derived from monomers which do not contain ionisable groups will be non-ionic.

Examples of flocculating agents which may be used are copolymers of sodium acrylates and acrylamides (anionic e.g. Betz 1100) copolymers of quaternary acrylate salts and acrylamides (cationic e.g. Betz 1159) and polyacrylamides (non-ionic e.g. Betz 1140).

The preferred neutralising agent is lime in view of its ready availability and the resultant production of calcium fluoride which is readily washable with water and can be disposed of as solid waste. The concentration of lime in the suspension may vary within wide limits, for example from 5% to 35% by weight, depending to some extent upon the amount of fluoride in the solution being treated, the pH of the solution and the desirability of maintaining alkaline earth metal deficiency. Usually, the concentration of lime will be below 25% by weight, for example from 10% to 20% by weight.

When using lime as the neutralising agent, it is preferred to incorporate a soluble calcium salt such as calcium chloride in the neutralising agent to provide more calcium ion dissolved in the agent for reaction with the fluoride ion. A typical procedure is then to add lime to the acidic solution containing flocculating agent to effect partial neutralisation and then to add a solution of a soluble calcium salt to the partially neutralised solution to effect further neutralisation and precipitate calcium fluoride.

Use of a soluble alkaline earth metal salt as well as the insoluble oxide or hydroxide is particularly desirable in cases where the solution being treated contains an alkali metal fluoride such as sodium fluoride in addition to hydrofluoric acid. This is often the case with effluent streams from fluorination reactions where for example an alkali metal hydroxide is used to effect removal of another type of impurity, e.g. chromium ion present as a result of using a chromia catalyst in the fluorination reaction. The treatment of acidic solutions containing an alkali metal fluoride and hydrogen fluoride with both an alkaline earth metal oxide or hydroxide and a soluble alkaline earth metal salt constitutes a particular embodiment of the invention.

Removal of fluoride ion from the solution as an insoluble fluoride and completion of neutralisation of the solution (or in practice usually over-neutralisation to pH 8 or 9) may be effected in the same treatment vessel. However, we prefer to add the soluble alkaline earth metal salt to effect the formation of the insoluble fluoride whilst the solution is still acidic, for example at pH 4 to 6, and to pass the resulting solution/suspension to a clarifier or settlement vessel where neutralisation (or over-neutralisation) is completed and the solids are allowed to settle out. Clear liquor can be removed from the upper part of the clarifier, so minimising the liquid load on the subsequent filter. Vacuum filtration is a suitable technique for removing the precipitated insoluble fluoride.

The clear liquid phase or clarate from the clarifier and the filtrate from the filtration step may be disposed of directly to drain. However, since these liquids will in practice usually be at pH 8 or 9, they provide a source of alkali for neutralising acid streams and may be recirculated to a convenient part of the treatment process and/or passed to a separate neutralising treatment of, for example, another acidic effluent stream. The liquors of pH 8 to 9 may be disposed of directly or the pH may be trimmed to about 7 by addition of say hydrochloric acid solution.

The process of the invention may be operated as a batch process but is preferably operated as a continuous process.

The invention is illustrated by the following examples.

EXAMPLE 1

An acidic solution in tap water, simulating a typical effluent from a fluorination plant, was prepared comprising sodium fluoride (1.9% by weight), hydrogen fluoride (0.6% by weight) and hydrogen chloride (0.074% by weight). The pH of the solution was 4.7.

As reagents were prepared an 18% by weight solution in tap water of calcium chloride (fused), a 15% by weight suspension in tap water of calcium oxide (slaked lime) and a 0.1% by weight solution in tap water of a cationic flocculating agent available as Betz 1159 from Betz Ltd.

A 200 ml sample of the simulated effluent was placed in a 400 ml polypropylene beaker fitted with a variable-speed paddle stirrer and to it was added 15 ml of the solution of flocculating agent to provide 15 mg of the flocculating agent in the effluent. The sample was stirred at 300 rpm (estimated) and the calcium oxide (slaked lime) suspension was added until the pH of the sample rose to 5.0 (approximately 5 to 8 ml of suspension). 15 ml of the calcium chloride solution were added immediately the pH reached 5.0; this addition resulted in a fall in pH of the sample to 4.6 whereupon further calcium oxide suspension was added dropwise until the pH of the sample again rose to 5.0 (approximately 2–3 ml of suspension).

Following this second addition of calcium oxide suspension a visible ball-shaped floc was produced over a period of 2–5 minutes which tightened to yield a heavy, granular (2–3 mm) sediment which settled even whilst stirring was continued and settled out to yield a clear supernatant liquid when stirring was ceased. The sediment was vacuum-filtered using a No 2 sintered glass funnel with water vacuum pump. The sediment was washed with tap water and re-filtered.

The sediment was readily filtered out both initially and after washing, leaving clear, essentially neutral filtrates suitable for direct disposal to drain.

During the flocculating and sedimentation step, the pH of the sample was observed to rise and any tendency for a rise above 7 was suppressed by addition of 1M hydrochloric acid as necessary.

EXAMPLE 2

The procedure described in Example 1 was repeated but using 6 mg of the flocculating agent instead of 15 mg. The resulting sediment was finer than that obtained in Example 1 (1 mm instead of 2–3 mm) but gave good initial filtration and medium (but acceptable) filtration after washing.

EXAMPLE 3

The procedure described in Example 1 was repeated but using an anionic flocculating agent instead of the cationic agent. The flocculating agent was Betz 1100 and an amount of 20 mg was added to the simulated effluent. The resulting sediment comprised flakes (1–2 mm) which exhibited good intitial filtration and medium-to-slow (but acceptable) filtration after washing.

EXAMPLE 4

The procedure described in Example 1 was repeated but using a non-ionic flocculating agent instead of the cationic agent. The agent was Betz 1140 and an amount of 20 mg was added to the simulated effluent. The resulting sediment comprised a slightly stringy, oval-shaped material (2-4 mm) which exhibited very good intitial filtration and medium (but acceptable) filtration after washing.

EXAMPLE 5

The procedure described in Example 1 was repeated (in a 500 ml beaker) up to the second addition of calcium oxide suspension to raise the pH of the solution again to 5.0 and form a ball floc.

The cloudy suspension was then stirred gently and a further 16 ml of the calcium chloride solution was added. The suspension was stirred for 2 minutes during which time additional calcium fluoride became incorporated in the floc. 5 ml of a 0.1% by weight solution of Betz 1159 flocculating agent was then added to the still-cloudy suspension, resulting in a clear liquor and a 3 mm ball floc. Slaked lime suspension was then added to adjust the pH of the clear liquor to 6 to 8.

The clear liquor was decanted and the sediment was filtered through a No 2 porosity sintered glass filter with water vacuum pump. The sediment was washed with water on the filter using a fine jet wash bottle.

The sediment exhibited excellent initial filterability and good filtration characteristics after washing.

The additional treatment steps post initial flocculation resulted in extremely low residual fluoride content in the treated effluent, for example usually below 20 ppm.

In a further experiment the post flocculation treatment was varied in that instead of separate additions of 16 ml of calcium chloride solution and slaked lime suspension for pH adjustment there was made a single addition of 16 ml of calcium chloride solution (15 ml) to which 1 ml of slaked lime suspension had been added. This variation had little or no effect on the filtration characteristics of the sediment or the residual fluoride content of the treated effluent.

EXAMPLE 6

The procedure described in Example 1 was repeated up to the stage of initial floc formation, except that 31 ml of calcium chloride solution were used instead of 15 ml, leading to a fall in pH to 2-2.4 instead of 4.6, and the dropwise addition of calcium oxide suspension raised the pH to 4.0 instead of 5.0.

The floc at this stage was a fine suspension. A gentle stirring regime was then adopted and 5 ml of the solution of Betz 1159 flocculating agent was added to the suspension, resulting in a clear liquid phase and a 1-2 mm ball floc. The liquid was decanted and the sediment was filtered out through a No 2 sintered glass funnel with water vacuum pump, washed with water and re-filtered out.

The sediment exhibited good initial filtration and medium filtration after washing.

We claim:

1. In a process for the treatment of acidic fluoride-containing solutions to neutralize them and to remove fluoride ion which comprises mixing the acidic solution with a suspension of an alkaline earth metal oxide or hydroxide as neutralizing agent, and flocculating the resulting precipitate with a flocculating agent, the improvement wherein said flocculating agent is incorporated in the acidic solution before mixing thereof with the alkaline earth metal oxide or hydroxide and only thereafter mixing the solution with the alkaline earth metal oxide or hydroxide to thereby remove the fluoride as a readily filterable precipitate.

2. A process as claimed in claim 1 wherein said mixing is carried out under conditions such that the fluoride ion is in stoichiometric excess with respect to alkaline earth metal ion.

3. A process as claimed in claim 1 or claim 2 wherein the amount of the flocculating agent incorporated in the acidic solutions is from 50 ppm to 0.1% by weight of the acidic solution.

4. A process as claimed in claim 3 wherein the acidic solution contains an alkali metal fluoride in addition to hydrofluoric acid and the solution is mixed with a soluble alkaline earth metal salt in addition to the alkaline earth metal oxide or hydroxide.

5. A process as claimed in claim 1 wherein the neutralising agent comprises lime.

6. A process as claimed in claim 5 wherein the lime comprises an aqueous suspension containing from 5% to 35% by weight of lime.

7. A process as claimed in claim 4 which comprises mixing the acidic solution with lime and subsequently with a solution of a soluble calcium salt.

8. A process as claimed in claim 1 wherein the flocculating agent is a cationic agent.

* * * * *